(No Model.)

W. ROSENFIELD.
BOOT OR SHOE CALK.

No. 327,596. Patented Oct. 6, 1885.

WITNESSES
P. W. Hale,
Harry V. Davis.

INVENTOR
William Rosenfield,
by J. M. Yznaga.
atty.

UNITED STATES PATENT OFFICE.

WILLIAM ROSENFIELD, OF MANISTEE, MICHIGAN.

BOOT OR SHOE CALK.

SPECIFICATION forming part of Letters Patent No. 327,596, dated October 6, 1885.

Application filed December 2, 1884. Serial No. 149,318. (No model.)

*To all whom it may concern:*

Be it known that I, WILLIAM ROSENFIELD, a citizen of the United States, residing at Manistee, in the county of Manistee and State of Michigan, have invented certain new and useful Improvements in Boot or Shoe Calks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to removable and replaceable calks for boots and shoes, such calks being for the purpose to prevent slipping on ice and to give a secure footing in rafting logs or climbing declivities.

The object of the invention is to provide for shoe calks or spikes suitable holding nuts or plates, which may be applied to the soles either before or after the soles are attached to the boots or shoes, and which are not liable to become loosened or detached by the shrinkage of the leather. They have a further advantage that they do not produce any unevenness of either surface of the sole. The invention consists in the calk-holding plate or nut of novel construction, and the combination of the same with a boot or shoe sole and a suitable calk, as hereinafter particularly described, and as illustrated in the accompanying drawings, in which—

Figure 1:
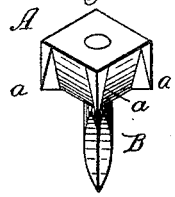
Figure 2:
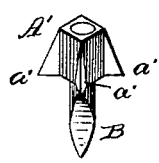
Figure 3:
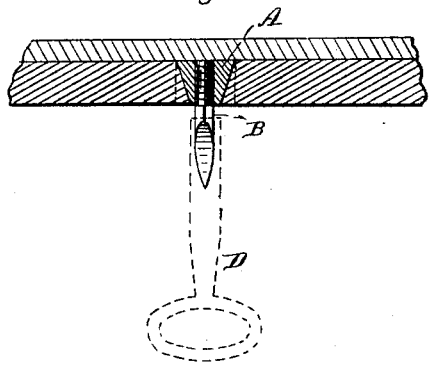
Figure 4:
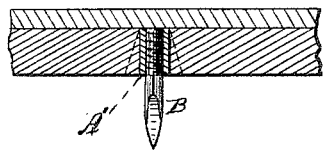
Figure 5:
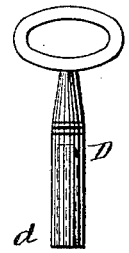
Figure 6:
Figure 7:
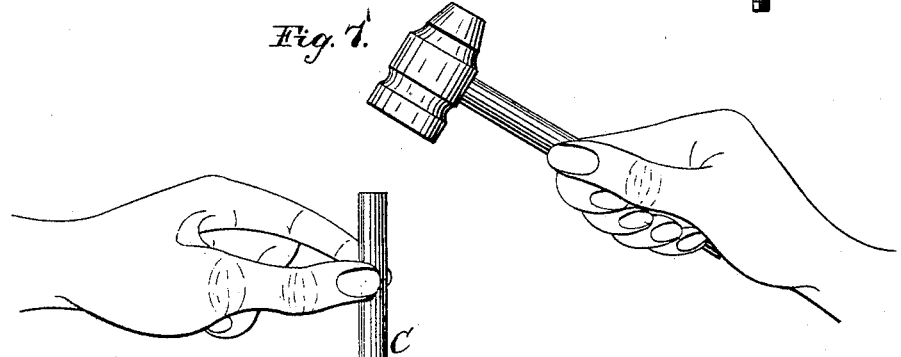

Figure 1 is a view of the calk-holding plate with a calk inserted therein. Fig. 2 is a modified form of the calk-holding plate or nut. Fig. 3 is a section of a portion of the bottom of a shoe, showing the form of nut shown in Fig. 1 as applied from the inner surface of the sole. Fig. 4 is a similar section showing the form of nut shown in Fig. 2 as applied from the under surface of the sole. Fig. 5 shows a form of key for removing and replacing the calks. Fig. 6 is a view of the tool used for inserting the nuts, and Fig. 7 illustrates the manner of using this tool.

Referring to Fig. 1, the letter A indicates an angular metallic nut or plate, having through it a screw-threaded aperture and wings or blades *a* projecting from its corners, while the side surfaces between said blades are beveled downward, or are inclined downward toward each other, thus giving the nut the general character of being a little larger at the top than at the bottom. This shape of nut is particularly applicable from the inner side of the sole and before the sole is attached to the boot or shoe.

The calk B has a pointed portion, which is angular in cross-section, and the screw-threaded shank, which fits the screw-threaded aperture of the nut. In applying this nut it is only necessary to make in the sole with any suitable pointed instrument a small either round or square hole not exceeding in width, preferably, the width of the bottom of the nut between its corner-blades. The nut may be then driven into this hole, and its main portion presses the leather outwardly to conform to its wedge-like shape, while the corner-blades cut into the leather and take a firm hold, so as to prevent the nut from turning and thereby working loose. In driving the nut into the sole I use a tool such as shown in Fig. 6, this tool being simply a short iron rod, C, having a portion at one end reduced and screw-threaded, as shown at *c*. This screw-threaded portion is screwed into the nut, and then the nut being placed in proper position two or three blows with a hammer on the upper end of the rod C will drive the nut snugly home, so that its upper surface will be flush with the inner surface of the sole, which may be then applied to a boot or shoe in the ordinary way, the thickness of the nut being such that its lower surface will be flush with or at least not projecting beyond the lower surface of the sole. Then it will be seen that by applying the key D to the angular portion of the calk its screw-threaded shank may be screwed into or removed from the nut at pleasure. Of course as many nuts may be applied to a sole as desired.

Referring now to Fig. 2, it will be seen that the surfaces of the nut A', between its corner-blades *a'*, are not inclined or sloping, but the edges of the blades are inclined lengthwise, as well as sharp at the edges. This form of nut is particularly adapted for application to soles which have already been attached to boots or shoes, for the reason that when driven into the sole it does not form a hole which is wider at the bottom than at the top, and therefore likely to let the nut drop out; but it will be observed that the corner-blades are made gradually thicker from their points to their lower and wider ends. This results in the leather being compressed between each two blades as the nut is driven home into the leather, so that a firm hold is thus secured. This form of nut is of course not so securely held to the sole as is the form shown in Fig. 1. I have found it to practically hold its position very well, and, like the form shown in Fig. 1, it requires no screws, nails, or other fastening than is embodied in its own construction.

The key D, for inserting and removing the calks, is similar to an ordinary clock-winding key, and has its shank $d$ provided with a socket corresponding to the angular point of the calk.

Having now described my invention and explained the manner of using the same, I claim—

1. The combination, with the calk-holding nut having its main portion wider at one end than at the other and provided with the projecting blades, of the screw-threaded calk adapted to be screwed into and removed from said nut, substantially as described.

2. The combination, with a shoe-sole and its inserted calk-holding nut provided with projecting blades, of the screw-shanked calk adapted for insertion into and removal from said nut, substantially as described.

In testimony whereof I affix my signature in presence of two witnesses.

WILLIAM ROSENFIELD.

Witnesses:
 N. W. NELSON,
 JACOB AARON.